United States Patent
Hung et al.

(10) Patent No.: US 10,768,038 B2
(45) Date of Patent: Sep. 8, 2020

(54) CONVEYOR WITH A WEIGHING SYSTEM FOR WEIGHING CARGOES AND WEIGHING METHOD THEREOF

(71) Applicant: Industrial Technology Research Institute, Hsinchu (TW)

(72) Inventors: Yun-Wei Hung, Taichung (TW); Ching-Tsung Cheng, New Taipei (TW); Chao-Hui Tu, Taoyuan (TW); Yung-Ping Tien, New Taipei (TW); Yan-Ling Liao, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 131 days.

(21) Appl. No.: 15/851,678

(22) Filed: Dec. 21, 2017

(65) Prior Publication Data

US 2019/0128729 A1 May 2, 2019

(30) Foreign Application Priority Data

Oct. 27, 2017 (TW) .............................. 106137218 A

(51) Int. Cl.
*G01G 11/00* (2006.01)
*G01G 19/03* (2006.01)
(Continued)

(52) U.S. Cl.
CPC .............. *G01G 11/00* (2013.01); *B65G 13/00* (2013.01); *B65G 15/28* (2013.01); *G01G 19/035* (2013.01);
(Continued)

(58) Field of Classification Search
CPC ..... G01G 11/00; G01G 11/046; G01G 19/035; B65G 13/00; B65G 15/28; B65G 2201/02; B65G 2203/0258
See application file for complete search history.

(56) References Cited

U.S. PATENT DOCUMENTS

| | | | | |
|---|---|---|---|---|
| 4,437,561 A | * | 3/1984 | Hasegawa | G01G 11/003 177/145 |
| 4,711,314 A | * | 12/1987 | Suzuki | G01G 3/1412 177/164 |

(Continued)

FOREIGN PATENT DOCUMENTS

| | | |
|---|---|---|
| CN | 2541825 | 3/2003 |
| CN | 2615652 | 5/2004 |

(Continued)

OTHER PUBLICATIONS

"Office Action of China Counterpart Application", dated Jun. 16, 2020, p. 1-p. 8.

*Primary Examiner* — Randy W Gibson
(74) *Attorney, Agent, or Firm* — JCIPRNET

(57) ABSTRACT

A conveyor with a weighing system includes a conveyance unit, a length calculation module, a weighing module, and a controller. The conveyance unit conveys a cargo to move. The length calculation module is arranged at one side of a front end of the conveyance unit to acquire a length of the cargo. The weighing module is arranged at a bottom part of the conveyor. The controller is connected to the length calculation module and the weighing module, such that based on the length acquired by the length calculation module, a weight of the cargo measured by the weighing module is provided. A weighing method of a conveyor is also provided.

15 Claims, 6 Drawing Sheets

(51) Int. Cl.
   *B65G 13/11*  (2006.01)
   *B65G 15/28*  (2006.01)
   *B65G 13/00*  (2006.01)

(52) U.S. Cl.
   CPC .......... *B65G 13/11* (2013.01); *B65G 2201/02* (2013.01); *B65G 2203/0258* (2013.01)

(56) References Cited

U.S. PATENT DOCUMENTS

| | | | | |
|---|---|---|---|---|
| 4,778,016 | A * | 10/1988 | Uchimura | G01G 23/3707 |
| | | | | 177/164 |
| 5,170,857 | A | 12/1992 | Phillips et al. | |
| 5,190,117 | A * | 3/1993 | Freeman | G01G 3/1402 |
| | | | | 177/211 |
| 5,230,391 | A * | 7/1993 | Murata | G01G 11/00 |
| | | | | 177/145 |
| 5,990,422 | A * | 11/1999 | Komori | G01G 19/035 |
| | | | | 177/119 |
| 6,433,288 | B1 * | 8/2002 | Olafsson | G01G 11/046 |
| | | | | 177/145 |
| 7,279,645 | B1 * | 10/2007 | Inglin | G01G 11/046 |
| | | | | 177/145 |
| 7,321,859 | B2 | 1/2008 | Cooper et al. | |
| 8,134,090 | B2 * | 3/2012 | Duppre | G01G 11/043 |
| | | | | 177/119 |
| 8,969,743 | B2 * | 3/2015 | Huebler | G01G 21/23 |
| | | | | 177/25.15 |
| 9,261,397 | B2 | 2/2016 | Wagner | |
| 2003/0132036 | A1 | 7/2003 | Johnson et al. | |
| 2003/0225712 | A1 | 12/2003 | Cooper et al. | |
| 2009/0032311 | A1 | 2/2009 | Duppre | |
| 2010/0126780 | A1 | 5/2010 | Inoue et al. | |
| 2012/0279787 | A1 | 11/2012 | Huebler et al. | |
| 2015/0225179 | A1 | 8/2015 | Araki et al. | |
| 2018/0257109 | A1 * | 9/2018 | Benedetti | G01G 11/046 |

FOREIGN PATENT DOCUMENTS

| | | |
|---|---|---|
| CN | 102026895 | 4/2011 |
| CN | 202098826 | 1/2012 |
| CN | 202974234 | 6/2013 |
| CN | 203037326 | 7/2013 |
| CN | 206255612 | 6/2017 |
| CN | 107187828 | 9/2017 |
| EP | 3072835 | 9/2016 |
| JP | H05116735 | 5/1993 |
| JP | H0820222 | 3/1996 |
| JP | H1183603 | 3/1999 |
| TW | I475197 | 3/2015 |
| TW | 201619581 | 6/2016 |

\* cited by examiner

CONVEYOR WITH A WEIGHING SYSTEM FOR WEIGHING CARGOES AND WEIGHING METHOD THEREOF

CROSS-REFERENCE TO RELATED APPLICATION

This non-provisional application claims priority under 35 U.S.C. § 119(a) on Patent Application No(s). 106137218 filed in Taiwan, R.O.C. on Oct. 27, 2017, the entire contents of which are hereby incorporated by reference.

BACKGROUND OF THE INVENTION

1. Field of the Invention

The disclosure relates to a conveyor with a weighing system and a weighing method of the conveyor.

2. Description of Related Art

Logistics industry needs to place cargos or products on conveyance rollers or a conveyance belt of conveyors in order to convey the cargos for saving human labor in traveling back and forth to move the cargos. Some of the logistic operation companies may weigh the cargos or the products before conveying the cargos or products by using the conveyors.

Static weighing is adopted in the logistics industry, where the weight and the location of a cargo are compared with data stored in a database to acquire the gravitational acceleration at the location for the cargo, and a result of weighing is obtained according to the weight and gravitational acceleration at the location of the cargo. Or, dynamic weighing may be adopted in the logistics industry, where a weighing machine installed on a conveyor is used to carry out an operation of weighing. Alternatively, a weighing machine may be installed under the conveyor for measuring the weight, from which the weight of the conveyor is subtracted to provide the weight of the cargo. Or, alternatively, a weighing machine is arranged in a middle section of the conveyor to acquire the weight of a cargo.

For a cargo having a size smaller than a width of the conveyor, it is convenient to weigh the cargo on the conveyor. Each time, only a single cargo can be weighed on a conveyor, and multiple cargos fail to be weighed on a conveyor simultaneously. Therefore, it requires spatial spacing between the cargos that are conveyed on the conveyor. Under the aforesaid situation, the larger the size of a cargo is, the larger the size of the conveyor is. This causes the problem that the spatial spacing between the cargos becomes larger. In general, for a conveyer with a regular weighing machine, this regular weighing machine fails to determine the weights of the multiple cargos.

SUMMARY OF THE INVENTION

In an embodiment of the disclosure, a conveyor with a weighing system, comprises a conveyance unit that conveys a cargo to move; a length calculation module that is arranged at one side of a front end of the conveyance unit to acquire a length of the cargo; a weighing module that is arranged at a bottom part of the conveyor; and a controller that is connected to the length calculation module and the weighing module, such that based on the length acquired by the length calculation module, a weight of the cargo measured by the weighing module is provided.

In another embodiment of the disclosure, a weighing method of a conveyor comprises: upon detecting an initial interface of a cargo, activating an encoder to start recording and accumulating at least one beginning data of the encoder; inputting multiple weight signals; upon detecting a final interface of the cargo, controlling the encoder to terminate the recording and acquiring a length of a cargo; and outputting one of the multiple weight signals corresponding to the length of the cargo to provide a weight of the cargo.

The foregoing will become better understood from a careful reading of a detailed description provided herein below with appropriate reference to the accompanying drawings.

DESCRIPTION OF THE EMBODIMENTS

Figure 1:
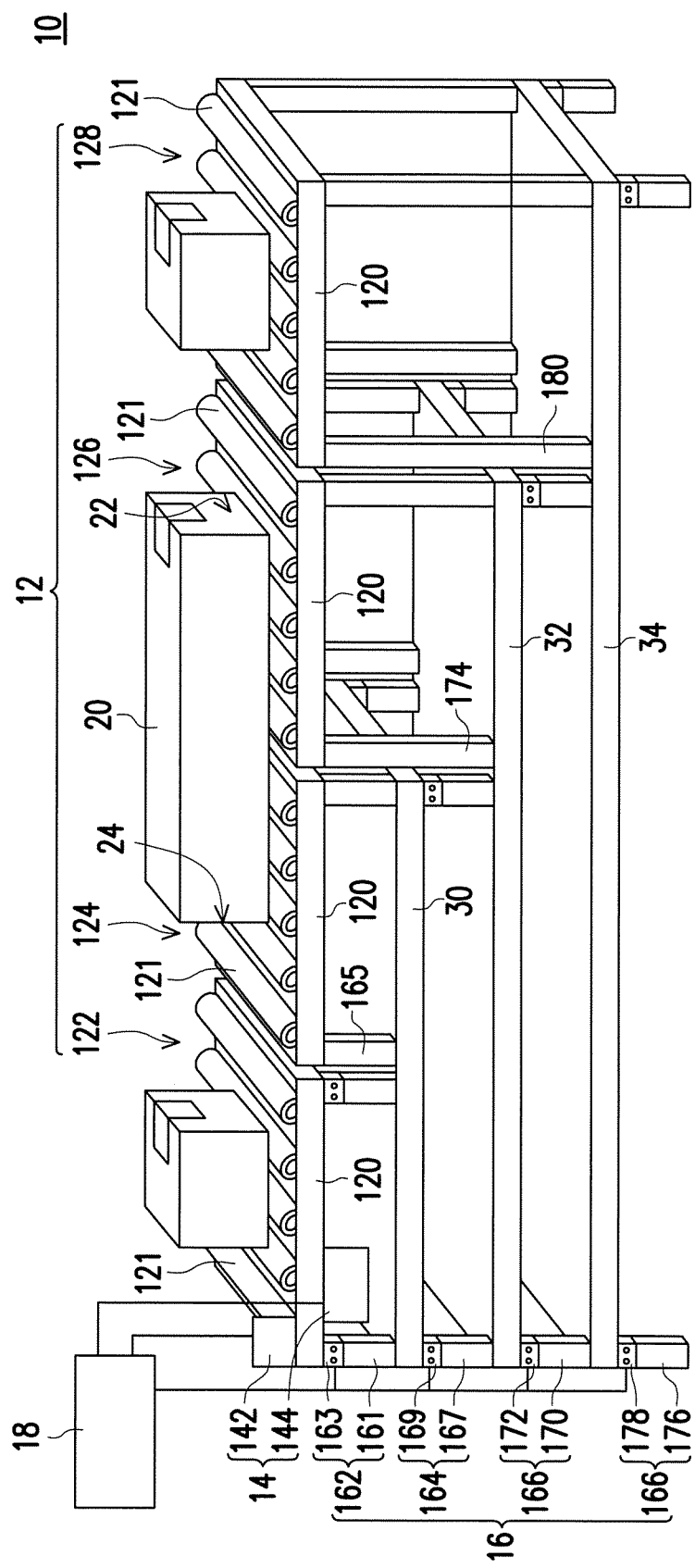
FIG. 1 is a perspective view, schematically illustrating a conveyor with a weighing system according to a first embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
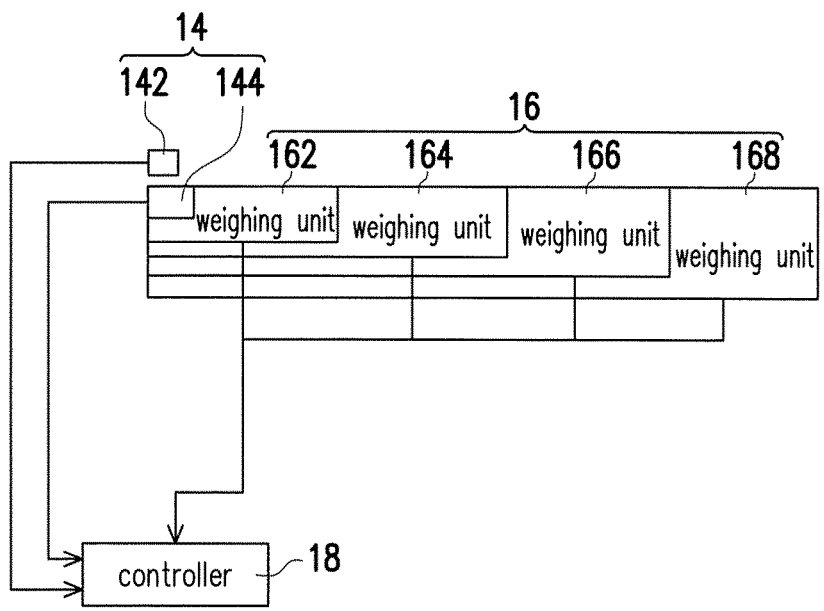
FIG. 2 is a side view schematically illustrating the conveyor with the weighing system shown in FIG. 1, according to an embodiment of the disclosure.

FIG. 1 is a perspective view, schematically illustrating a conveyor 10 with a weighing system according to a first embodiment of the disclosure. FIG. 2 is a side view schematically illustrating the conveyor with the weighing system shown in FIG. 1, according to an embodiment of the disclosure. The conveyor 10 with the weighing system allows a weighing operation to be carried out during the conveyance of a cargo. The conveyor 10 with the weighing system allows multiple cargos to be arranged thereon, wherein the multiple cargos may be, but not limited to of various or different sizes.

Referring to FIGS. 1 and 2, the conveyor 10 with the weighing system comprises a conveyance unit 12, a length calculation module 14, a weighing module 16, and a controller 18. The conveyance unit 12 conveys a cargo 20 to move. The conveyance unit 12 comprises a plurality of conveyance sections such as 122, 124, 126 and 128 that are connected in cascade. Each of the conveyance sections 122, 124, 126 and 128 comprises a frame 120 and a plurality of rollers 121 arranged on the frame 120. The plurality of rollers are rotatable. In an embodiment of the disclosure, each of the conveyance sections 122, 124, 126 and 128 may further comprise a conveyance belt (not shown). The inventive concept of the conveyance structure may be embodied in various forms without being limited to the exemplary embodiments set forth herein.

The length calculation module 14 is arranged at one side of a front end of the conveyance unit 12 to acquire a length of the cargo 20. In an embodiment, the length calculation module 14 comprises a sensor 142 and an encoder 144. When an initial interface 22 of the cargo 20 moves with the conveyor 10 and passes through the sensor 142, the sensor 142 detects the initial interface 22 of the cargo 20 and activates the encoder 144 to start recording. When a final interface 24 of the cargo 20 passes through the sensor 142, the sensor 142 detects the final interface 24 of the cargo 20 and informs the encoder 144 to terminate the recording. Based on this, the length of the cargo 20 can be calculated. Details will be discussed hereinafter. The inventive concept of the length calculation may be embodied in various ways without being limited to the exemplary embodiments set forth herein.

In an embodiment, the initial interface 22 of the cargo 20 is defined as a front end surface of the cargo 20 and the final interface 24 of the cargo 20 is defined as a rear end surface of the cargo 20.

In an embodiment, the sensor 142 is arranged at one side of the first conveyance section 122 and the encoder 144 is also set at one side of the first conveyance section 122. The sensor 142 and the encoder 144 may be arranged at the same side or at different sides. The sensor 142 and the encoder 144 are both connected to the controller 18.

In an embodiment, the weighing module 16 of the conveyor 10 is arranged at a bottom part of the conveyor 10. Based on the length data acquired by the length calculation module 12, a weighing operation can be carried out for the cargo 20 on the conveyor 10 to acquire the weight of the cargo 20. The weighing module 16 comprises one or more levels of weighing units such as 162, 164, 166 and 168. Each of the weighing units 162, 164, 166 and 168 comprises a plurality of support elements 161 arranged under each respective frame 120 to support the respective frame 120. There are at least two the load cells 163 arranged between the respective frame 120 and each of the support elements 161, to measure the weight of the cargo 20 on the conveyor 10. The inventive implementation of the weighing module may be embodied in various ways without being limited to the exemplary embodiments set forth herein. For example, an arrangement that one single load cell 163 is provided between the respective frame 120 and at least two support elements 161 is also feasible.

In an embodiment, the weighing module 16 comprises a plurality of levels of weighing unit. The plurality of levels of weighing unit at least comprises a first-level weighing unit 162, a second-level weighing unit 164, a third-level weighing unit 166, and a fourth-level weighing unit 168 that are stacked sequentially. The first-level weighing unit 162 is located under the first conveyance section 122, and the first-level weighing unit 162 comprises a plurality of support elements 161 arranged under the frame 120 of the first conveyance section 122 to support the frame 120. At least two load cells 163 are arranged between the frame 120 and each of the support elements 161 to measure the weight of the cargo 20 on the conveyor 10.

In an embodiment, the second-level weighing unit 164 is arranged under the first conveyance section 122 and the second conveyance section 124, and the second-level weighing unit 164 comprises a plurality of support elements 167 arranged under two respective frames 120 of the first conveyance section 122 and the second conveyance section 124, respectively. A first board 30 is arranged between the first-level weighing unit 162 and the second-level weighing unit 164. At least two the load cells 169 are arranged between the first board 30 and the plurality of support elements 167 of the second-level weighing unit 164 to measure the weight of the cargo 20 on the conveyor 10. A plurality of support elements 165 are arranged under the second conveyance section 124, but without arranging any load cell between the plurality of support elements 165. The plurality of support elements 165 are arranged on the first board 30.

In an embodiment, the third-level weighing unit 166 is arranged under the first conveyance section 122, the second conveyance section 124, and the third conveyance section 126, and the third-level weighing unit 166 comprises a plurality of support elements 170 arranged under three respective frames 120 of the first conveyance section 122, the second conveyance section 124, and the third conveyance section 126, respectively. A second board 32 is arranged between the second-level weighing unit 164 and the third-level weighing unit 166. At least two load cells 172 are arranged between the second board 32 and the plurality of support elements 170 of the third-level weighing unit 166 to measure the weight of the cargo 20 on the conveyor 10. A plurality of support elements 174 are arranged under the third conveyance section 126, but without arranging any load cell between the plurality of support elements 174.

In an embodiment, the fourth-level weighing unit 168 is arranged under the first conveyance section 122, the second conveyance section 124, the third conveyance section 126, and the fourth conveyance section 128. The fourth-level weighing unit 168 comprises a plurality of support elements 176 arranged under four respective frames 120 of the first conveyance section 122, the second conveyance section 124, the third conveyance section 126, and the fourth conveyance section 128, respectively. A third board 34 is arranged between the third-level weighing unit 166 and the fourth-level weighing unit 168. At least two load cells 178 are arranged between the third board 34 and the plurality of support elements 176 of the fourth-level weighing unit 168 to measure the weight of the cargo 20 on the conveyor 10. A plurality of support elements 180 are arranged under the fourth conveyance section 128, but without arranging any load cell between the plurality of support elements 180.

In an embodiment, based on the structural arrangement mentioned above, one or more levels of weighing unit may be expansively included in the weighing module 16, such as a fifth-level weighing unit, a sixth-level weighing unit, and so on, may be further included in the weighing module 16. Therefore, cargos of different sizes may correspond to their respective levels of weighing unit, according to the acquired length of each of the cargos of different sizes. Accordingly, the weights of the cargos with different sizes can be measured, for example, by using the weighing units arranged at their respective levels of weighing unit.

The controller 18 is connected to the length calculation module 14 and the weighing module 16. The controller 18 receives a length signal acquired from the length calculation module 14 and makes the weighing module 16 supply a weight signal so as to acquire the weight of the cargo 20.

Figure 3:
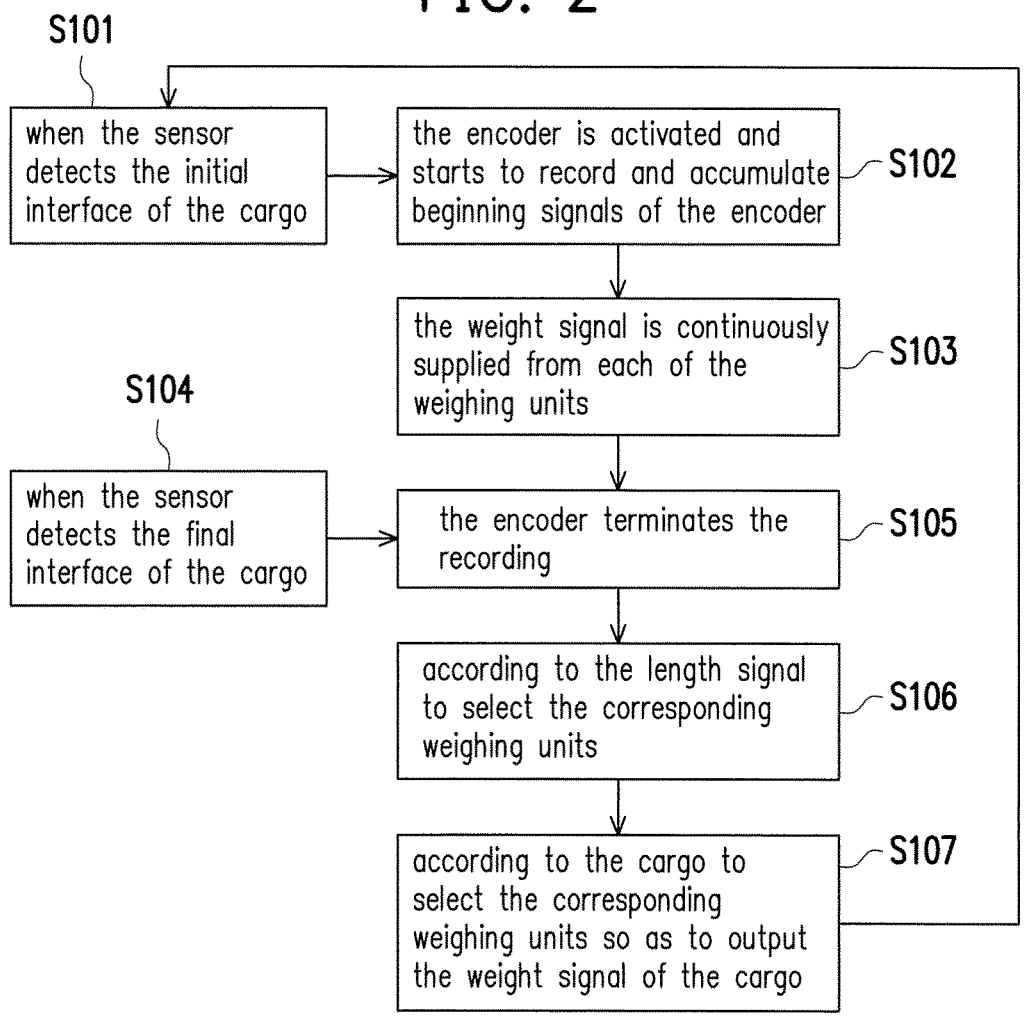
FIG. 3 is a flow chart illustrating an operation flow of the conveyor with the weighing system shown in FIG. 1, according to an embodiment of the disclosure.

FIG. 3 is a flow chart illustrating an operation flow of the conveyor with the weighing system shown in FIG. 1, according to an embodiment of the disclosure. In the embodiment of FIG. 3, the controller 18 stores a length combined by conveyance sections corresponding to a group of load cells of each of at least one level of weighing unit of the weighing module such as four levels of weighing unit 162, 164, 166 and 168. Wherein each of the conveyance sections has a length of such as 40 cm that corresponds to a load cell group of the first-level weighing unit 162 and the load cell group comprises two or four load cells. Each weight signal from each of the load cells is fed into the controller 18. When the sensor 142 detects the initial interface 22 of the cargo 20 (S101), the encoder 144 is activated and starts to record and accumulate beginning signals of the encoder 144 (S102). At this moment, the weight signal is continuously supplied from each of the load cells (S103). When the sensor 142 detects the final interface 24 of the cargo 20 (S104), the encoder 144 terminates the recording (S105). At this moment, the controller 18 receives a termination signal from the encoder 144 (indicating the encoder terminates the recording). The signals of the encoder 144 can be multiplied by a length represented by each turn of the encoder 144 to obtain the length that the cargo 20 passes through. A microprocessor (not shown) of the controller 18 may use the length signal to select the weight signal from one of the weighing units 162, 164, 166 and 168 corresponding to the output (S106) to be displayed on a display device (not shown) (S107). The above-described step that the sensor 142 detects the initial interface 22 of the cargo 20 is repeated again for recalculating the length of a next cargo to acquire the weight of the next cargo.

Figure 4:
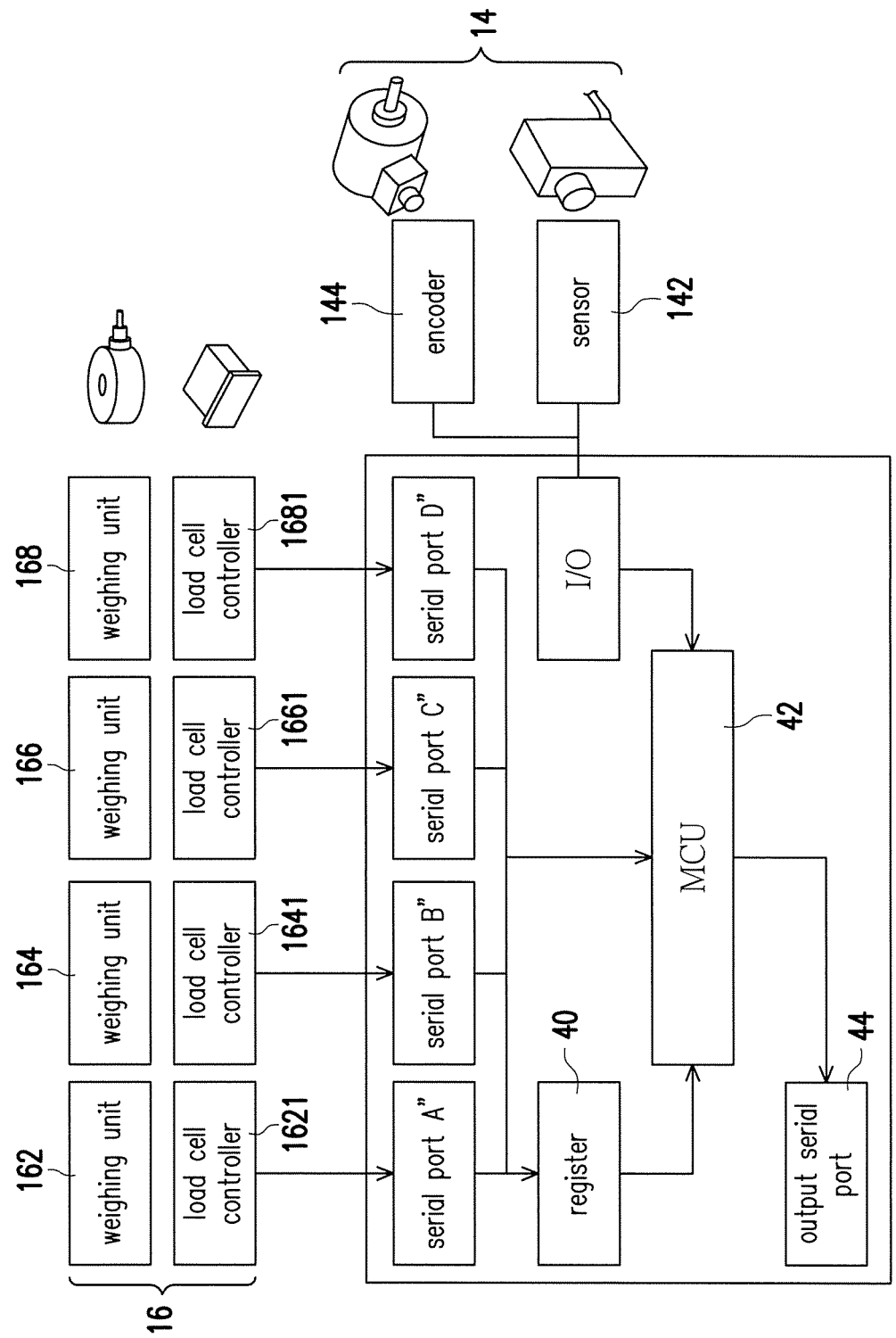
FIG. 4 is a system block diagram of the conveyor with the weighing system shown in FIG. 1, according to an embodiment of the disclosure.

FIG. 4 is a system block diagram of the conveyor with the weighing system shown in FIG. 1, according to an embodiment of the disclosure. In the embodiment of FIG. 4, the weighing module 16 comprises a first-level weighing unit 162, a second-level weighing unit 164, a third-level weighing unit 166, and a fourth-level weighing unit 168. Each level of weighing units 162, 164, 166 and 168 comprises at least two load cells. The first-level weighing unit 162, the second-level weighing unit 164, the third-level weighing unit 166, and the fourth-level weighing unit 168 are each provided with their respective load cells and a their respective load cell controller 1621, 1641, 1661 and 1681. Each of the load cell controllers 1621, 1641, 1661 and 1681 converts an analog signal from each of the load cells into a digital signal. The four digital signals are stored in a register 40 through their respective serial ports, which are serial port A", a serial port B", a serial port C" and a serial port D", respectively. Signals from the sensor 142 and the encoder 144 are supplied to a microprocessor (MCU) 42 for processing. In other words, the sensor 142 detects the initial interface 22 of the cargo 20 and activates the encoder 144 to start to record and accumulate the beginning signals of the encoder 144. At this moment, each of load cells continuously supplies the weight signal. When the sensor 142 detects the final interface 24 of the cargo 20, the encoder 144 terminates the recording. The microprocessor 42 performs a calculation and acquires the length of the cargo 20. Based on the length of the cargo 20, the microprocessor 42 identifies a corresponding one of the first-level weighing unit 162, the second-level weighing unit 164, the third-level weighing unit 166, and the fourth-level weighing unit 168, and outputs the weight of the cargo 20 through an output serial port 44.

Figure 5:
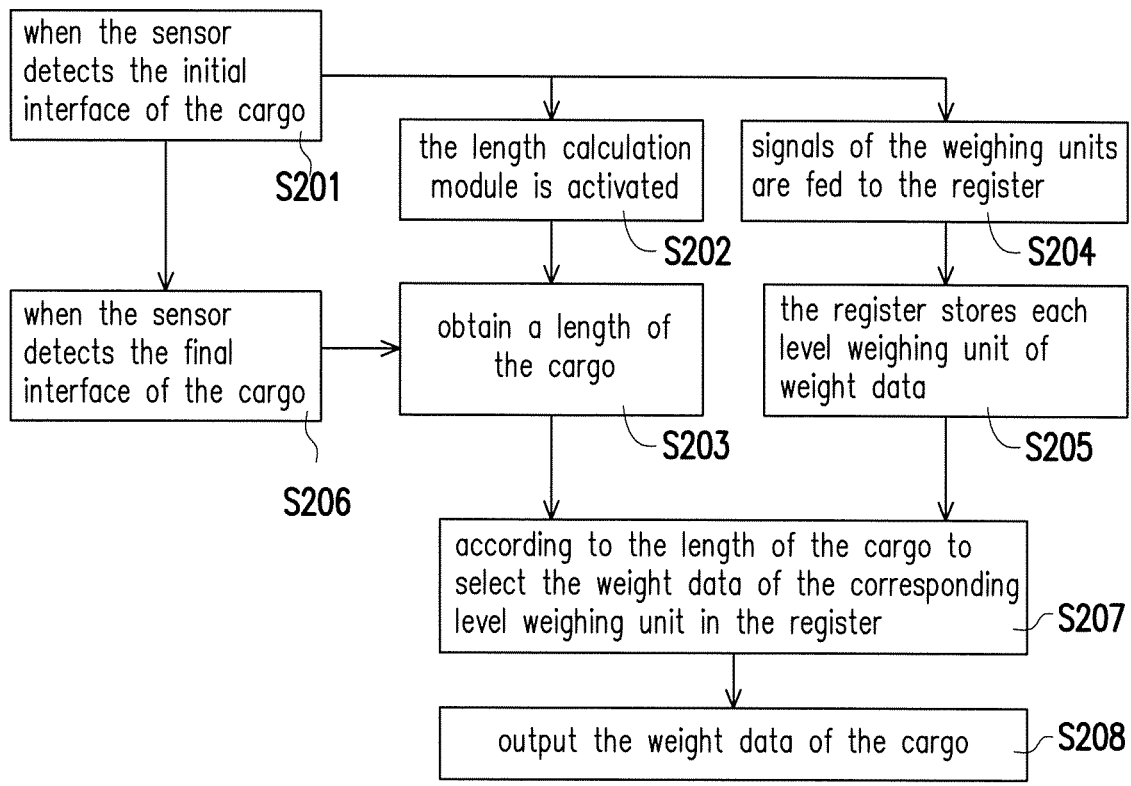
FIG. 5 is a flow chart illustrating a weighing operation of the conveyor with the weighing system shown in FIG. 1, according to an embodiment of the disclosure.

FIG. 5 is a flow chart illustrating a weighing operation of the conveyor with the weighing system shown in FIG. 1, according to an embodiment of the disclosure. The weighing operation carried out by the microprocessor 42 according to the disclosure is described as follows. When the sensor 142 detects the initial interface 22 of the cargo 20 (S201), the encoder 144 of the length calculation module 14 is activated (S202) to acquire a length of the cargo 20 (S203), and signals of the first-level weighing unit 162, the second-level weighing unit 164, the third-level weighing unit 166, and the fourth-level weighing unit 168 are fed to the register 42 (S204) for storing weight data (S205). After the encoder 144 of the length calculation module 14 is activated, it starts to record and accumulate beginning signals of the encoder 144. At this moment, each of load cells continuously supplies the weight signal. When the sensor detects the final interface of the cargo (S206), the encoder terminates the recording. Based on the length of the cargo, one of the first-level weighing unit 162, the second-level weighing unit 164, the third-level weighing unit 166, and the fourth-level weighing unit 168 that corresponds to the length of the cargo is selected (S207), and the weight of the cargo is output (S208). For example, the first-level weighing unit 162 corresponds to a cargo of 0-40 cm; the second-level weighing unit 164 corresponds to a cargo of 40-80 cm; the third-level weighing unit 166 corresponds to a cargo of 80-120 cm; the fourth-level weighing unit 168 corresponds to a cargo of 120-160 cm, and so on.

Figure 6:
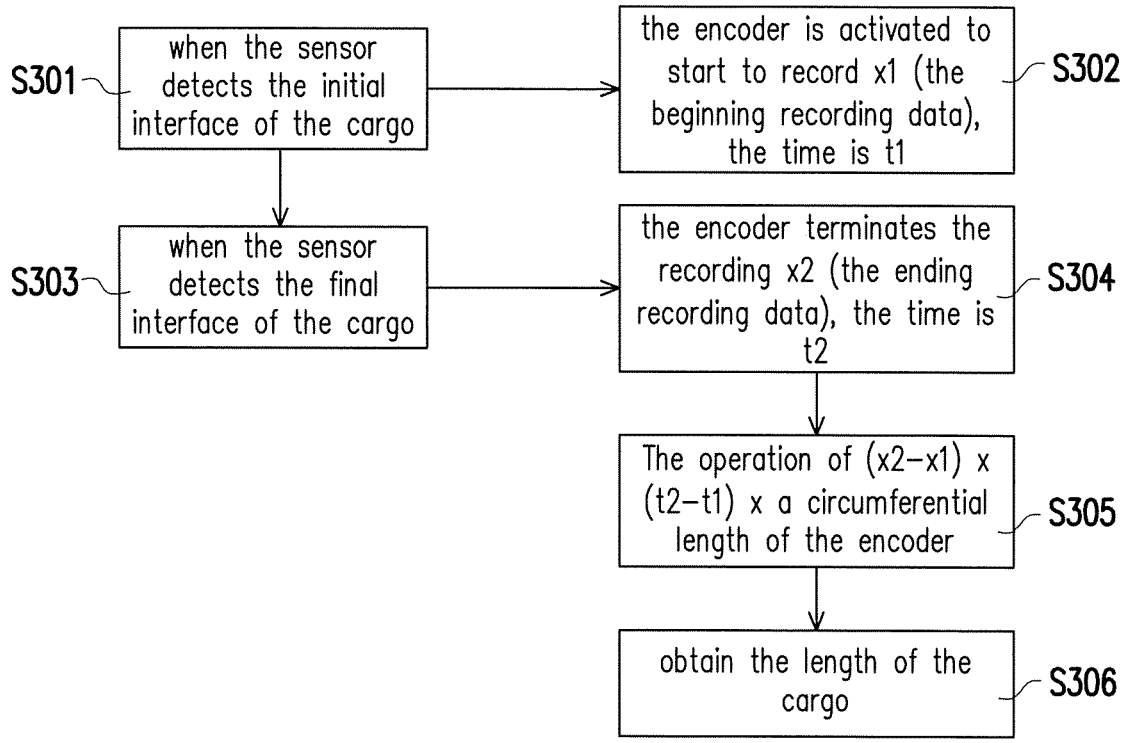
FIG. 6 is a flow chart illustrating a length calculation operation of the conveyor with the weighing system shown in FIG. 1, according to an embodiment of the disclosure.

FIG. 6 is a flow chart illustrating a length calculation operation of the conveyor with the weighing system shown in FIG. 1, according to an embodiment of the disclosure. When the sensor 142 detects the initial interface 22 of the cargo 20 (S301), the encoder 144 is activated to start to record x1 (the beginning recording data), and at this moment, the time is t1 (S302). When the sensor 142 detects the final interface 24 of the cargo 20 (S303), the encoder 144 terminates the recording x2 (the ending recording data), and at this moment, the time is t2 (S304). The operation of (x2−x1)×(t2−t1)×a circumferential length of the encoder 144 (S305) provides the length of the cargo (S306). The circumferential length of the encoder 144 defines the number of revolutions of the wheel of the encoder 144× the circumferential length of wheel of the encoder 144 contacts with the conveyor belt.

Figure 7:
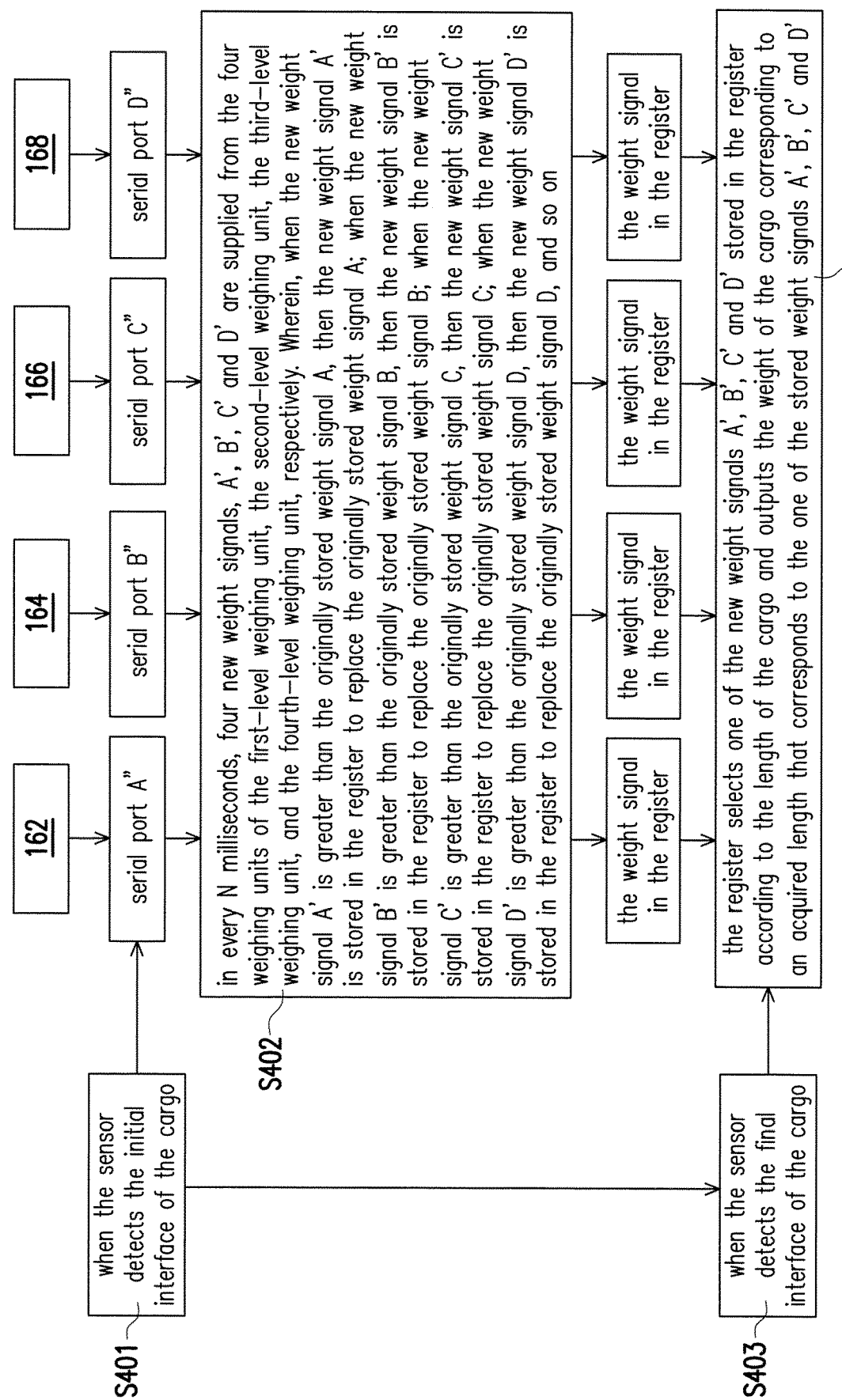
FIG. 7 is a flow chart illustrating an output operation of weight data of the conveyor with the weighing system shown in FIG. 1, according to an embodiment of the disclosure.

FIG. 7 is a flow chart illustrating an output operation of weight data of the conveyor with the weighing system shown in FIG. 1, according to an embodiment of the disclosure. When the sensor 142 detects the initial interface 22 of the cargo 20 (S401), the weight signals A~D of the first-level weighing unit 162, the second-level weighing unit 164, the third-level weighing unit 166, and the fourth-level weighing unit 168 are fed, through the serial port A", the serial port B", the serial port C", and the serial port D", respectively, into the register 40 for storing the weight data For example, in every N milliseconds, four new weight signals, A', B', C' and D' are supplied from the four load cells of the first-level weighing unit 162, the second-level weighing unit 164, the third-level weighing unit 166, and the fourth-level weighing unit 168, respectively. Wherein, when the new weight signal A' is greater than the originally stored weight signal A, then the new weight signal A' is stored in the register 40 to replace the originally stored weight signal A; when the new weight signal B' is greater than the originally stored weight signal B, then the new weight signal B' is stored in the register 40 to replace the originally stored weight signal B; when the new weight signal C' is greater than the originally stored weight signal C, then the new weight signal C' is stored in the register 40 to replace the originally stored weight signal C; when the new weight signal D' is greater than the originally stored weight signal D, then the new weight signal D' is stored in the register 40 to replace the originally stored weight signal D, and so on (S402).

When the sensor 142 detects the final interface 24 of the cargo 20 (S403), the register 40 selects one of the new weight signals A', B', C' and D' stored in the register 40 according to the length of the cargo 20 and output the weight of the cargo corresponding to an acquired length that corresponds to the one of the stored weight signals A', B', C' and D' (S404).

Figure 8:
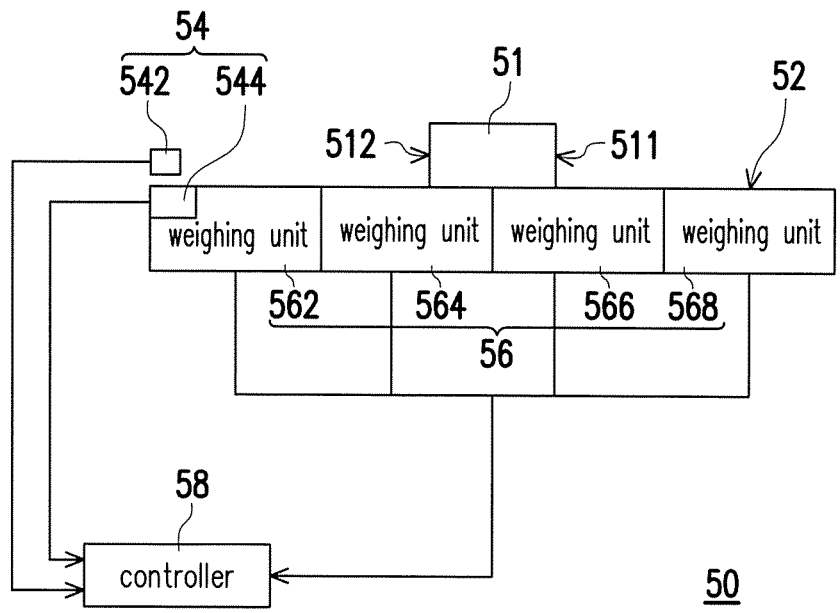
FIG. 8 is a side view, schematically illustrating a conveyor with a weighing system according to a second embodiment of the disclosure.

FIG. 8 is a side view, schematically illustrating a conveyor with a weighing system 50 according to a second embodiment of the disclosure. In the embodiment of FIG. 8, the conveyor with the weighing system 50 comprises a conveyance unit 52, a length calculation module 54, a weighing module 56, and a controller 58. The conveyance unit 52 conveys a cargo 51 to move. The conveyance unit 52 comprises a plurality of conveyance sections connected in cascade. Each of the conveyance sections comprises a frame, and a plurality of rollers that are mounted on the frame and are rotatable. In another embodiment, each conveyance section may further comprise a conveyance belt. The conveyance structure may also refer to the structure of the conveyance unit 12 illustrated in FIG. 1. The inventive concept of the conveyance structure may be embodied in various forms without being limited to the exemplary embodiments set forth herein.

The length calculation module 54 is arranged at one side of a front end of the conveyance unit 52 to acquire a length of the cargo 51. In an embodiment, the length calculation module 54 comprises a sensor 542 and an encoder 544. When an initial interface 511 of the cargo 51 moves with the conveyor 10 and passes through the sensor 542, the sensor 542 detects the initial interface 511 of the cargo 51 and activates the encoder 544 to start recording. When a final interface 512 of the cargo 51 passes through the sensor 542, the sensor 542 detects the final interface 512 of the cargo 51 and informs the encoder 544 to terminate the recording. Thus, based on this, the length of the cargo 51 can be calculated. Details are already illustrated in FIG. 6 and repeated description will be omitted herein. The inventive concept of the length calculation may be embodied in various ways without being limited to the exemplary embodiments set forth herein.

In an embodiment, the sensor 542 is arranged at one side of the first conveyance section and the encoder 544 is also set at one side of the first conveyance section. The sensor 542 and the encoder 544 may be arranged at the same side or at different sides. The sensor 542 and the encoder 544 are both connected to the controller 58.

In an embodiment, a weighing module 56 of the conveyor 50 is arranged at a bottom part of the conveyor. Based on the length data acquired by the length calculation module 54, a weighing operation can be carried out for the cargo 51 on the conveyor 50 to acquire the weight of the cargo 51. The weighing module 16 comprises a plurality of weighing units such as 562, 564, 566 and 568. Each of the weighing units 562, 564, 566 and 568 comprises a plurality of support elements arranged under each respective frame to support the frame. A load cell is arranged between the frame and each of the support elements to measure the weight of the cargo on the conveyor. The inventive implementation of the weighing module may be embodied in various ways without being limited to the exemplary embodiments set forth herein. For example, an arrangement that one single load cell is provided between the frame and at least two support elements is also feasible. Reference is also drawn to the illustration of the weighing unit of FIG. 1.

In an embodiment, the weighing module 56 comprises multiple weighing units such as 562, 564, 566 and 568 that are connected in cascade. The weighing units such as 562, 564, 566 and 568 are referred to as a first weighing unit 562, a second weighing unit 564, a third weighing unit 566, and a fourth weighing unit 568, respectively. Each of the first weighing unit 562, the second weighing unit 564, the third weighing unit 566, and the fourth weighing unit 568 is connected to the controller 58. Thus, when the length calculation module 54 acquires the length of the cargo 51, and accesses one of the first weighing unit 562, a combination of the first and the second weighing units 562 and 564, a combination of the first, the second, and the third weighing units 562, 564 and 566, and a combination of the first, the second, the third, and the fourth weighing units 562, 564, 566 and 568, the weight of the cargo 51 can be obtained according to the said one that corresponds to the acquired length of the cargo 51. In the instant embodiment, operation flows of the length calculation and weight storing may be understood by referring to the embodiments in FIGS. 6 and 7.

In an embodiment, based on the structural arrangement provided in the aforesaid description, one or more weighing units may be expansively included in the weighing module, such as a fifth weighing unit and a sixth weighing unit connected in cascade, and so on may be further included in the weighing module 56. Therefore, for the cargos of different sizes, their respective combined weighing units corresponding to their respective different sizes may be acquired from the weighing module, according to the acquired length of each of the cargos of different sizes. Accordingly, for the cargos of different sizes, their respective lengths can be measured, as shown in FIG. 8.

The controller 58 is connected to the length calculation module 54 and the weighing unit 56. The controller 58 receives a length signal acquired from the length calculation module 54 and makes one of the first weighing unit 562, the combination of the first and the second weighing units 562 and 564, the combination of the first, the second, and the third weighing units 562, 564 and 566, and the combination of the first, the second, the third, and the fourth weighing units 562, 564, 566 and 568, supply a weight signal so as to acquire the weight of the cargo 51, wherein said one corresponds to the length signal received by the controller 58.

Figure 9:
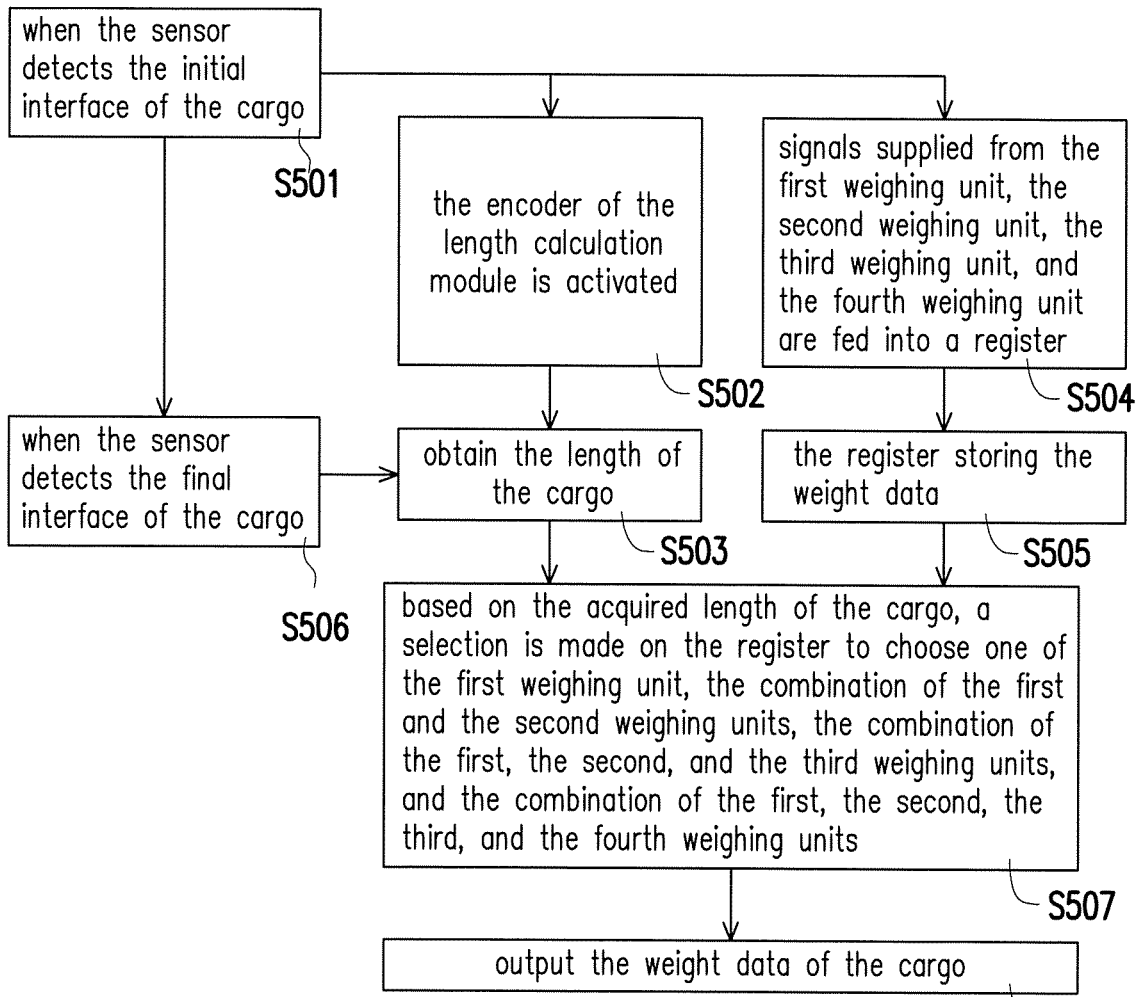
FIG. 9 is a flow chart illustrating an operation flow of the conveyor with the weighing system shown in FIG. 8, according to an embodiment of the disclosure.

FIG. 9 is a flow chart illustrating an operation flow of the conveyor with the weighing system shown in FIG. 8, according to an embodiment of the disclosure. In the embodiment of FIG. 9, the operation flow of a microprocessor is described as follows. When the sensor 542 detects the initial interface 511 of a cargo (S501), the encoder 544 of the length calculation module 54 is activated (S502) to acquire the length of the cargo 51 (S503), and signals supplied from the first weighing unit 562, the second weighing unit 564, the third weighing unit 566, and the fourth weighing unit 568 are fed into a register (S504) for storing the weight data (S505). After the encoder 544 is activated, it starts recording and accumulating beginning signals of the encoder 544. At this moment, each of the load cells continuously supplies the weight signal. When the sensor 542 detects the final interface 512 of the cargo 51 (S506), the encoder 544 terminates the recording. Based on the acquired length of the cargo 51, a selection is made on the register to choose one of the first weighing unit 562, the combination of the first and the second weighing units 562 and 564, the combination of the first, the second, and the third weighing units 562, 564 and 566, and the combination of the first, the second, the third, and the fourth weighing units 562, 564, 566 and 568 (S507) to output the weight of the cargo (S508), wherein said one corresponds to the acquired length of the cargo. For example, the first weighing unit 562 corresponds to a cargo of 0-40 cm; the combination of the first and the second weighing units 562 and 564 corresponds to a cargo of 40-80 cm; the combination of the first, the second, and the third weighing units 562, 564 and 566 corresponds to a cargo of 80-120 cm; and the combination of the first, the second, the third, and the fourth weighing units 562, 564, 566 and 568 corresponds to a cargo of 120-160 cm, and so on.

In summary, the disclosure uses a length calculation module to acquire a length of a cargo, and to acquire a weight of the cargo from at least one weighing unit of a weighing module, wherein said at least one weighing unit corresponds to the acquired length of the cargo, so that weighing can be carried out without shutting down a conveyor, wherein a spatial spacing between cargos of different sizes that is required for weighing the cargos on a conveyor can be reduced.

The disclosure also provides a solution wherein the measurement of a cargo is carried with a weighing conveyor in respect of a size of the cargo and a weighing mechanism of the conveyor is put into operation in combination therewith to measure a weight, in such a way that no increase of a spatial spacing between cargos is necessary. Further, the weighing operation of the cargo can be carried out during the movement of the conveyor.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A conveyor with a weighing system, comprising:
a conveyance unit, conveying a cargo to move and comprising a plurality of conveyance sections connected in cascade, wherein each of the plurality of conveyance sections comprises a frame, wherein the plurality of conveyance sections comprises a first conveyance section, a second conveyance section, a third conveyance section and a fourth conveyance section;
a length calculation module, arranged at one side of a front end of the conveyance unit to acquire a length of the cargo;
a weighing module, arranged at a bottom part of the conveyor and comprising a plurality of weighing units connected in cascade, wherein each of the plurality of weighing units is provided with a plurality of load cells, the plurality of weighing units at least comprises a first-level to fourth-level weighing units, and the first-level to fourth-level weighing units are stacked in sequence, wherein
the first-level weighing unit is located under the first conveyance section and comprises a plurality of first support elements arranged under a first frame of the first conveyance section to support the first frame, wherein at least one of the load cells is arranged between the first frame and each of the first support elements,
the second-level weighing unit is arranged under the first conveyance section and the second conveyance section, and comprises a plurality of second support elements respectively arranged under the first frame of the first conveyance section and a second frame of the second conveyance section, a first board is arranged between the first-level weighing unit and the second-level weighing unit, wherein at least one of the load cells is arranged between the first board and each of the second support elements,
the third-level weighing unit is arranged under the first conveyance section, the second conveyance section and the third conveyance section, and comprises a plurality of third support elements respectively arranged under the first, the second and a third frames of the first conveyance section, the second conveyance section, and the third conveyance section, a second board is arranged between the second-level weighing unit and the third-level weighing unit, wherein at least one of the load cells is arranged between the second board and each of the third support elements,
the fourth-level weighing unit is arranged under the first conveyance section, the second conveyance section, the third conveyance section, and the fourth conveyance section, and comprises a plurality of fourth support elements respectively arranged under the first, the second, the third and a fourth frames of the first conveyance section, the second conveyance section, the third conveyance section, and the fourth conveyance section, a third board is arranged between the third-level weighing unit and the fourth-level weighing unit, wherein at least one of the load cells is arranged between the third board and each of the fourth support elements; and
a controller, storing a length combined by the conveyance sections corresponding to the load cells of each of the plurality of weighing units of the weighing module, and connected to the length calculation module and the weighing module to provide, based on the length acquired by the length calculation module, a weight of the cargo measured by the weighing module.

2. The conveyor with the weighing system as claimed in claim 1, wherein each of the plurality of conveyance sections further comprises a plurality of rollers that are mounted on the frame and are rotatable.

3. The conveyor with the weighing system as claimed in claim 2, further comprising a conveyance belt arranged on the plurality of rollers for movement.

4. The conveyor with the weighing system as claimed in claim 1, wherein the length calculation module comprises a sensor and an encoder, wherein when the sensor detects an initial interface of the cargo, the encoder is activated for recording, and when the sensor detects a final interface of the cargo, the encoder terminates the recording, based on which a length of cargo is calculated.

5. The conveyor with the weighing system as claimed in claim 4, wherein the sensor is arranged at a first side of the plurality of conveyance sections and the encoder is arranged at a second side of the plurality of conveyance sections, wherein the first side and the second side are a same side or different sides.

6. The conveyor with the weighing system as claimed in claim 1, wherein at least two first load cells are arranged between the first frame and each of the plurality of first support elements to measure the weight of the cargo on the conveyor; at least two second load cells are arranged between the first board and the plurality of second support elements; at least two third load cells are arranged between the second board and the plurality of third support elements; and at least two fourth load cells are arranged between the third board and the plurality of fourth support elements.

7. The conveyor with the weighing system as claimed in claim 1, wherein each of a plurality of weighing units of the weighting module is further provided with a load-cell controller, wherein the load-cell controller converts an analog signal of the at least one load cell into a digital signal and stores the digital signal in a register.

8. The conveyor with the weighing system as claimed in claim 1, wherein each of the plurality of weighing units comprises a plurality of support elements respectively arranged under the frame to support the frame, and at least two load cells are arranged between the frame and each of the plurality of support elements to measure the weight of the cargo on the conveyor.

9. The conveyor with the weighing system as claimed in claim 1, wherein each of the plurality of weighing units is connected to the controller, wherein when the length calculation module acquires the length of the cargo, the weight of the cargo is acquired from a corresponding one of the plurality of weighing units or from a combination of at least two weighing units connected in cascade of the plurality of weighing units.

10. A weighing method of a conveyor, comprising:
upon detecting an initial interface of a cargo by a sensor, activating an encoder to start to accumulate at least one recording of the encoder, wherein the cargo is conveyed by a conveyance unit comprising a plurality of conveyance sections connected in cascade, wherein each of the plurality of conveyance sections comprises a frame, and the plurality of conveyance sections comprise a first conveyance section, a second conveyance section, a third conveyance section and a fourth conveyance section;
inputting multiple weight signals to a register, wherein a weighing module is arranged at a bottom part of the conveyor and comprises a plurality of weighing units connected in cascade, wherein each of the plurality of weighing units is provided with a plurality of load cells, the plurality of weighing units at least comprises a first-level to fourth-level weighing units, and the first-level to fourth-level weighing units are stacked in sequence, wherein
the first-level weighing unit is located under the first conveyance section and comprises a plurality of first support elements arranged under a first frame of the first conveyance section to support the first frame, wherein there is at least one of the load cells arranged between the first frame and each of the first support elements,
the second-level weighing unit is arranged under the first conveyance section and the second conveyance section, and comprises a plurality of second support elements respectively arranged under the first frame of the first conveyance section and a second frame of the second conveyance section, a first board is arranged between the first-level weighing unit and the second-level weighing unit, wherein there is at least one of the load cells arranged between the first board and each of the second support elements,
the third-level weighing unit is arranged under the first conveyance section, the second conveyance section and the third conveyance section, and comprises a plurality of third support elements respectively arranged under the first, the second and a third frames of the first conveyance section, the second conveyance section, and the third conveyance section, a second board is arranged between the second-level weighing unit and the third-level weighing unit, wherein there is at least one of the load cells arranged between the second board and each of the third support elements,
the fourth-level weighing unit is arranged under the first conveyance section, the second conveyance section, the third conveyance section, and the fourth conveyance section, and comprises a plurality of fourth support elements respectively arranged under the first, the second, the third and a fourth frames of the first conveyance section, the second conveyance section, the third conveyance section, and the fourth conveyance section, a third board is arranged between the third-level weighing unit and the fourth-level weighing unit, wherein there is at least one of the load cells arranged between the third board and each of the fourth support elements;
upon detecting a final interface of the cargo by the sensor, controlling the encoder to terminate the recording and acquiring a length of the cargo, wherein during a period of acquiring the length of the cargo, each of the load cells of the weighing units successively supplies the weight signal of the multiple weight signals to the register, and the register stores the received weight signal, wherein when a new weight signal is inputted by one of the load cells of the weighing units and greater than an originally stored weight signal, the originally stored weight signal is replaced with the new weight signal; and
outputting one of the multiple weight signals corresponding to the length of the cargo from the register to acquire a weight of the cargo.

11. The weighing method of the conveyor as claimed in claim 10, wherein the encoder is activated for recording a beginning recording data x1 at a time point t1, and upon detecting the final interface of the cargo by the sensor, the encoder terminates an ending recoding data x2 at a time point t2, wherein a multiplication of (x2−x1)×(t2−t1)×a circumferential length of the encoder is carried out to acquire the length of the cargo.

12. The weighing method of the conveyor as claimed in claim 10, wherein upon detecting the initial interface of the cargo by the sensor, the multiple weight signals of the weighing units are supplied through their respective serial ports and are stored in the register, wherein the new weight signal is inputted by each of the load cells in a time interval of milliseconds.

13. The weighing method of the conveyor as claimed in claim 10, wherein upon detecting the final interface of the cargo by the sensor, based on the length of the cargo that corresponds to one of the multiple weight signals stored in the register, the register outputs the weight of the cargo associated with the one of the multiple weight signals stored in the register.

14. The weighing method of the conveyor as claimed in claim 10, wherein upon detecting the initial interface of the cargo by the sensor, the encoder of a length calculation module is activated to acquire the length of the cargo, and the multiple weight signals of the weighing units are supplied and stored in the register; and when the encoder terminates the recording, based on the length of the cargo, a selection is made on the register in order to choose one weighing unit or a combination of at least two weighing units connected in cascade from the multiple weighing units to output the weight of the cargo.

15. The conveyor with the weighing system as claimed in claim 1, wherein during a period of acquiring the length of the cargo, the load cells of the weighing units continuously supply multiple weight signals to a register, and the register stores the multiple weight signals, wherein when a new weight signal is inputted by one of the load cells of the weighing units and greater than an originally stored weight signal, the register stores the new weight signal to replace the originally stored weight signal, the register output one of the multiple weight signals corresponding to the length of the cargo to acquire the weight of the cargo.

* * * * *